(12) United States Patent
Gyllenskog (10) Patent No.: US 11,144,448 B2
(45) Date of Patent: Oct. 12, 2021

(54) MEMORY SUB-SYSTEM FOR MANAGING FLASH TRANSLATION LAYERS TABLE UPDATES IN RESPONSE TO UNMAP COMMANDS

(71) Applicant: Micron Technology, Inc., Boise, ID (US)

(72) Inventor: Christian M Gyllenskog, Meridian, ID (US)

(73) Assignee: Micron Technology, Inc., Boise, ID (US)

(*) Notice: Subject to any disclaimer, the term of this patent is extended or adjusted under 35 U.S.C. 154(b) by 135 days.

(21) Appl. No.: 16/532,149

(22) Filed: Aug. 5, 2019

(65) Prior Publication Data

US 2021/0042220 A1  Feb. 11, 2021

(51) Int. Cl.
*G06F 12/02* (2006.01)
*G06F 3/06* (2006.01)
*G06F 12/0804* (2016.01)

(52) U.S. Cl.
CPC ........ *G06F 12/0246* (2013.01); *G06F 3/0608* (2013.01); *G06F 3/0659* (2013.01); *G06F 12/0804* (2013.01); *G06F 3/0679* (2013.01)

(58) Field of Classification Search
CPC .. G06F 12/0246; G06F 3/0608; G06F 3/0659; G06F 12/0804; G06F 3/0679
See application file for complete search history.

(56) References Cited

U.S. PATENT DOCUMENTS

| | | | | |
|---|---|---|---|---|
| 9,514,041 | B2* | 12/2016 | Takeuchi | G06F 3/0688 |
| 2012/0110249 | A1* | 5/2012 | Jeong | G06F 3/0659 |
| | | | | 711/103 |
| 2019/0369892 | A1* | 12/2019 | Huang | G06F 3/0632 |

* cited by examiner

*Primary Examiner* — Idriss N Alrobaye
*Assistant Examiner* — Richard B Franklin
(74) *Attorney, Agent, or Firm* — Schwegman Lundberg & Woessner, P.A.

(57) ABSTRACT

Method for managing flash translation layers (FTL) table updates in response to unmap commands starts with an unmap controller receiving unmap command that comprises a listing of regions in at least one memory component to be unmapped. Unmap controller updates an unmap regions list based on the unmap command. Unmap controller receives a write command to non-volatile memory component. Unmap controller determines, using the unmap regions list, if a write command occurs in a portion of an unmapped region of the non-volatile memory component. In response to determining that write command occurs in the portion of the unmapped region of the non-volatile memory component, unmap controller loads logical-to-physical (L2P) row to volatile memory. L2P row comprises a set of L2P entries mapping the portion of the unmapped region of the non-volatile memory component. Unmap controller then causes the set of L2P entries to be unmapped.

20 Claims, 5 Drawing Sheets

FIG. 1

| ENTRY | MEMORY COMPONENT | REGIONS | AVAILABILITY FLAG |
|---|---|---|---|
| 1 | 112A | BLOCKS A1-A10 | AVAILABLE |
| 2 | 112A | BLOCKS B1-B5 | AVAILABLE |
| 3 | 112B | BLOCKS C1-C3 | NOT AVAILABLE |

MEMORY SUB-SYSTEM FOR MANAGING FLASH TRANSLATION LAYERS TABLE UPDATES IN RESPONSE TO UNMAP COMMANDS

TECHNICAL FIELD

Embodiments of the disclosure relate generally to memory sub-systems, and more specifically, relate to a memory sub-system managing flash translation layers (FTL) table updates in response to unmap commands to decrease activity performed by media components and further help return unmap commands quickly.

BACKGROUND

A memory system can be a storage system, such as a solid-state drive (SSD), and can include one or more memory components that store data. For example, a memory system can include memory devices such as non-volatile memory devices and volatile memory devices. In general, a host system can utilize a memory system to store data at the memory devices of the memory system and to retrieve data stored at the memory system.

BRIEF DESCRIPTION OF THE DRAWINGS

The present disclosure is illustrated by way of example and not limitation in the figures of the accompanying drawings, in which like references indicate similar elements.

DETAILED DESCRIPTION

Aspects of the present disclosure are directed to a memory sub-system managing flash translation layers (FTL) table updates in response to unmap commands to decrease latencies and work performed by media components during unmap commands. A memory sub-system is also hereinafter referred to as a "memory device". An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

The memory sub-system can include multiple memory components that can store data from the host system. An unmap command (or trim command) indicates to a memory component (e.g., SSD, NAND flash memory, etc.) which blocks of data are no longer considered in use and can be deleted internally. Executing an unmap command requires managing FTL table data within the memory components which forces many reads and write operations from the memory components. For example, the process of unmapping includes loading a logical-to-physical (L2P) table row which includes a set of L2P entries, forwarding each of the entries, performing mechanics on each of the entries and rewriting the L2P row or chunk of L2P row back to the memory component. Further, the process of unmapping can impact many parts of the FTL tables simultaneously which requires the loading and manipulation of each of the FTL tables. A conventional memory sub-system updates the FTL tables immediately upon receipt of the unmap command. This can cause high latency before the unmap command completes due to the increased activity required to be performed by the memory components.

Aspects of the present disclosure address the above and other deficiencies by having a memory sub-system that manages when the FTL table updates caused by unmap commands are performed. The memory sub-system maintains an unmap regions list that is an updated list of regions in the memory components that are unmapped. The memory sub-system checks against the unmap regions list before accessing the FTL tables stored within the memory components to avoid loading and modifying FTL tables that are only affected by the unmap command. Accordingly, the memory sub-system can delay FTL table updates and opportunistically perform the unmapping when the appropriate regions are already loaded into the volatile memory (e.g., RAM) from the memory components (e.g., NAND). This ultimately decreases the total number of write operations needed to be performed to accomplish the unmapping, decreases write amplification, and increases the performance of the unmapping, especially in the case of large unmap operations.

Figure 1:
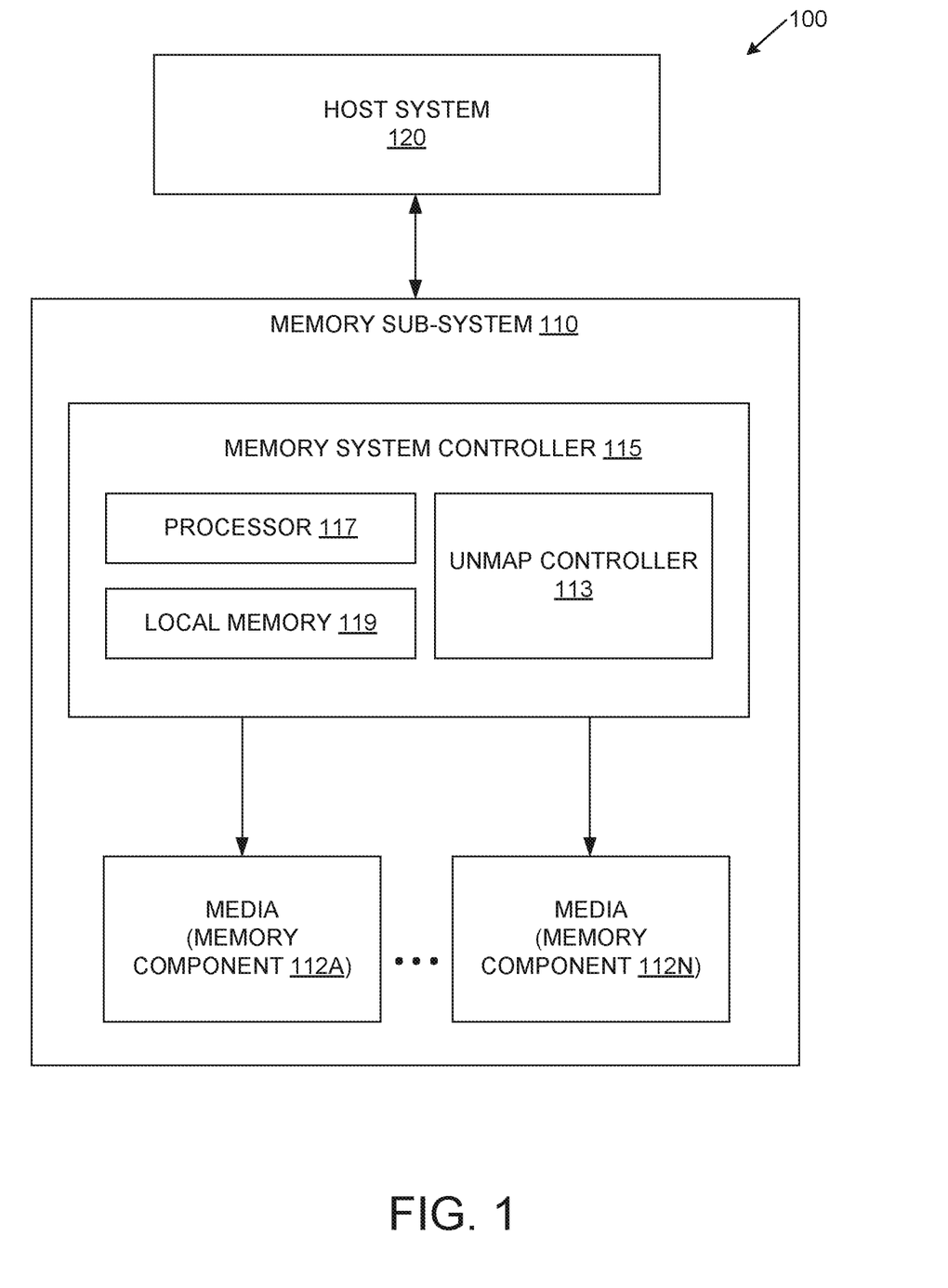
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is an SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein. "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes an unmap controller 113 that can be used to manage the FTL tables within the memory devices using an unmap regions list to accomplish the unmapping process. In some embodiments, the controller 115 includes at least a portion of the unmap controller 113. For example, the controller 115 can include a processor 117 (processing device) configured to execute instructions stored in local memory 119 for performing the operations described herein. In some embodiments, the unmap controller 113 is part of the host system 110, an application, or an operating system.

The unmap controller 113 can maintain an unmap regions list that is an updated list of unmapped regions in the memory components 112A to 112N of the memory sub-system 110. The unmap controller 113 can refer to the unmap regions list that is stored in a non-volatile memory to determine whether a region is unmapped and thus, contains no data. Rather than perform updating the FTL tables within a non-volatile memory component upon receipt of an unmap command, the regions indicated in the unmap command to be unmapped are added to the list of unmap regions list. Using the unmap regions list, the unmap controller 113 can opportunistically perform unmapping when unmapped regions are loaded into the volatile memory. For example, upon receiving a write command to a non-volatile memory component such as a NAND (flash) memory, the unmap controller 113 determines, using the unmap regions list, if the write command occurs in an unmapped region of the NAND memory. If the write command occurs in the unmapped region of the NAND memory, the unmap controller 113 can opportunistically perform the unmapping of the unmapped region since the region will be loaded into the volatile memory (e.g., RAM) in response to the write command. For example, when the write command is determined to occur in the unmapped region of the NAND memory, the unmap controller 113 can load into a RAM a logical-to-physical (L2P) row from the NAND's FTL table that includes a set of L2P entries mapping the unmapped region of NAND memory and cause the set of L2P entries to be unmapped. By delaying the update of the FTL table, the total number of write operations needed to be performed to accomplish the unmapping is decreased. Further details with regards to the operations of the unmap controller 113 are described below.

Figure 2:
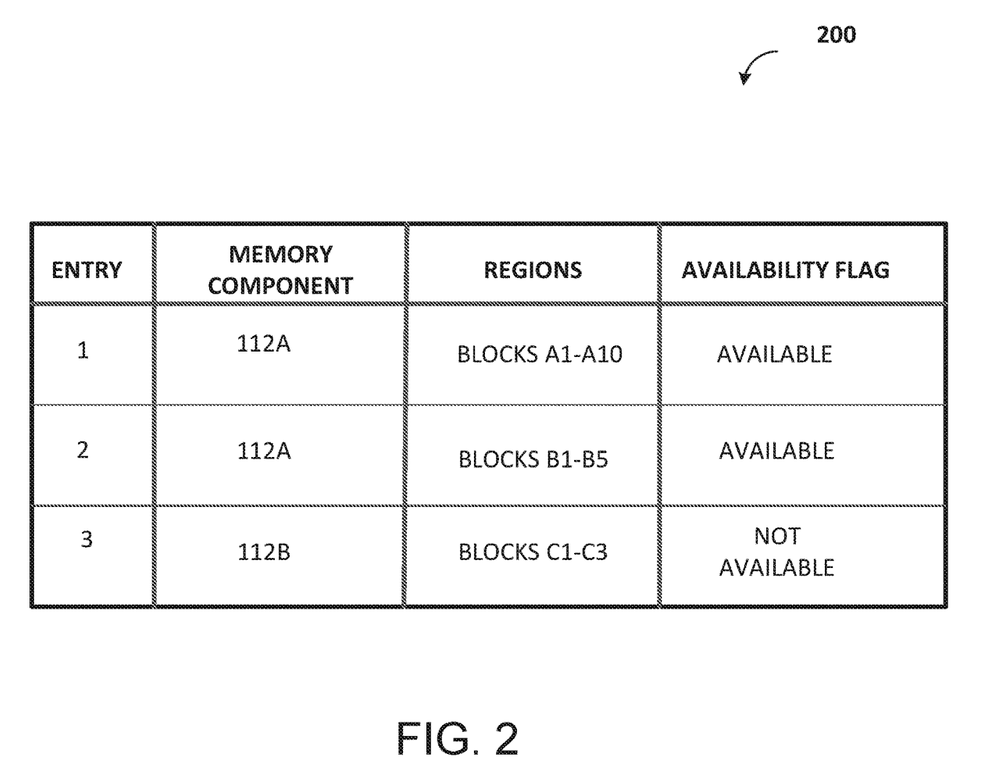
FIG. 2 is an example of an unmap regions list in accordance with some embodiments of the present disclosure.

FIG. 2 is an example of an unmap regions list in accordance with some embodiments of the present disclosure. The unmap regions list 200 comprises a plurality of entries that include an identification of the media component 112A to 112N, an identification of the unmap region, and an availability flag. The number of entries can be dynamically adjusted according to workflows. The unmap region can be indicated as the logical or physical addresses of blocks of data. The availability flag is a flag that indicates whether the entry in the unmap regions list is available or not available. The availability flag for an entry in the unmap regions list is set to available when the L2P entries in an L2P row corresponding to the region in the entry of the unmap regions list have been unmapped. For example, in FIG. 2, the availability flag for the third entry is set to available when the L2P entries in the L2P row in media component 112B corresponding to blocks C1-C3 have been unmapped.

Figure 3:
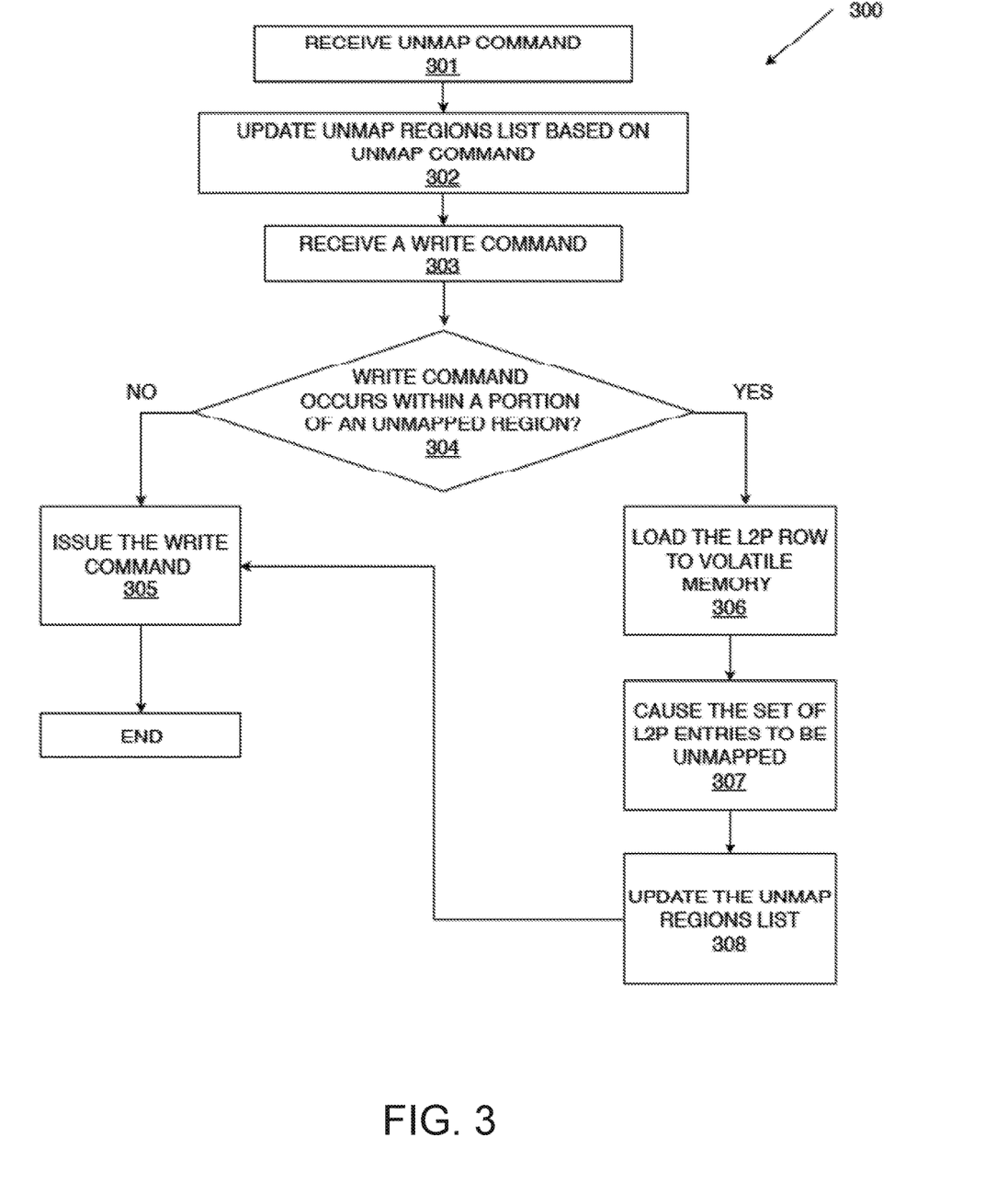
FIG. 3 is a flow diagram of an example method to manage FTL table updates in response to unmap commands in accordance with some embodiments of the present disclosure.

FIG. 3 is a flow diagram of an example method 300 to manage FTL table updates in response to unmap commands in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the memory unmap controller 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 301, the unmap controller 113 receives an unmap command that includes a listing of the regions in at least one of the memory components 112A to 112N to be unmapped. At operation 302, the unmap controller 113 updates an unmap regions list based on the unmap command. To update the unmap regions list, in operation 302, the unmap controller 113 can add entries corresponding to the listing of the regions in the unmap command to the unmap regions list. To add entries to the unmap regions list, the unmap controller 113 can determine if a first region in the listing of the regions in the unmap command is adjacent to a region indicated in an existing entry that one of the entries in the unmap regions list and extend the region indicated in the existing entry to include the first region when the first region is adjacent to the existing entry. Thus, new unmaps (e.g., the first region) that are Logical Block Addresses (LBA) adjacent with an unmapped region (e.g., range corresponding to an existing entry in the unmap regions list) will cause the existing range to be extended to include the new unmap. For example, referring to FIG. 2, if the first region in the listing of the regions in the unmap command includes data blocks C4-C5 in media component 112B, the unmap controller 113 determines that the blocks C4-C5 in media component 112B are adjacent to block C3 in media component 112B listed in the third entry, and extends the region in the third listing from blocks C1-C3 to blocks C1-C5.

The unmap controller 113, as shown at operation 303, receives a write command to the non-volatile memory component. The write component can be received from the host and the non-volatile memory component can be a NAND memory component. At operation 304, the unmap controller 113 determines, using the unmap regions list, if the write command occurs in a portion of an unmapped region included in the non-volatile memory component. In one embodiment, the portion of the unmapped region included in the non-volatile memory component is an entirety of the unmapped region. The non-volatile memory includes a flash translation layers (FTL) table that maps Logical Block Addresses (LBA) from the host to Physical Block Addresses (PBA) on the non-volatile memory component. The FTL table includes a plurality of logical-to-physical (L2P) rows. Each of the L2P rows includes a L2P entries.

As shown at operation 305, in response to determining that the write command does not occur in a portion of an unmapped region included in the non-volatile memory component, the unmap controller 113 issues the write command to the non-volatile memory component.

Thereafter, in response to determining that the write command occurs in the portion included in the unmapped region of the non-volatile memory component, the unmap controller 113 loads to the volatile memory an L2P row that comprises a set of L2P entries mapping the portion of the unmapped region included in the non-volatile memory component (see at operation 306).

At operation 307, the unmap controller 113 causes the set of L2P entries to be unmapped. In one embodiment, if the portion of the unmapped region included in the non-volatile memory component is mapped by L2P entries that are included in a plurality of L2P rows, each of the rows are loaded in operation 306 and the L2P entries are unmapped in operation 307.

As shown at operation 308, the unmap controller 113 updates the unmap regions list after causing the set of L2P entries to be unmapped. When the L2P row encompasses all of a region indicated in an existing entry in the unmap regions list, the unmap controller 113 updates the unmap regions list to indicate that the existing entry is available. In one embodiment, the unmap controller modifies the availability flag for the existing entry to indicate that the existing entry is available.

When the L2P row splits a region indicated in an existing entry in the unmap regions list, the unmap controller 113 updates the unmap regions list by splitting the existing entry into two separate entries (e.g., first split entry and second split entry) that includes unmap regions, respectively. In one embodiment, the unmap controller 113 determines whether the first or the second split entry is associated with a smaller unmap region. In response to determining that the first split entry is associated with a smaller unmap region than the second split entry, the unmap controller 113 loads the L2P row that maps the smaller unmap region into the non-volatile memory can causes the L2P entries in the L2P row to the be unmapped. In one embodiment, each of the L2P entries in the L2P row is unmapped according to the boundaries of the unmap region of the first split entry.

Once the unmap regions list is updated in operation 308, the unmap controller issues the write command to the non-volatile memory component. In one embodiment, the unmap regions list is stored in another non-volatile memory component included in the memory components 112A-112N.

The unmap controller 113 can load the unmap regions list to the volatile memory. The unmap controller 113 can also reload the unmap regions list to the volatile memory when an activity is performed that causes the unmap regions list to be removed from the volatile memory. For example, the unmap controller 113 can reload the unmap regions list to the volatile memory after power cycles or sleep operations.

Figure 4:
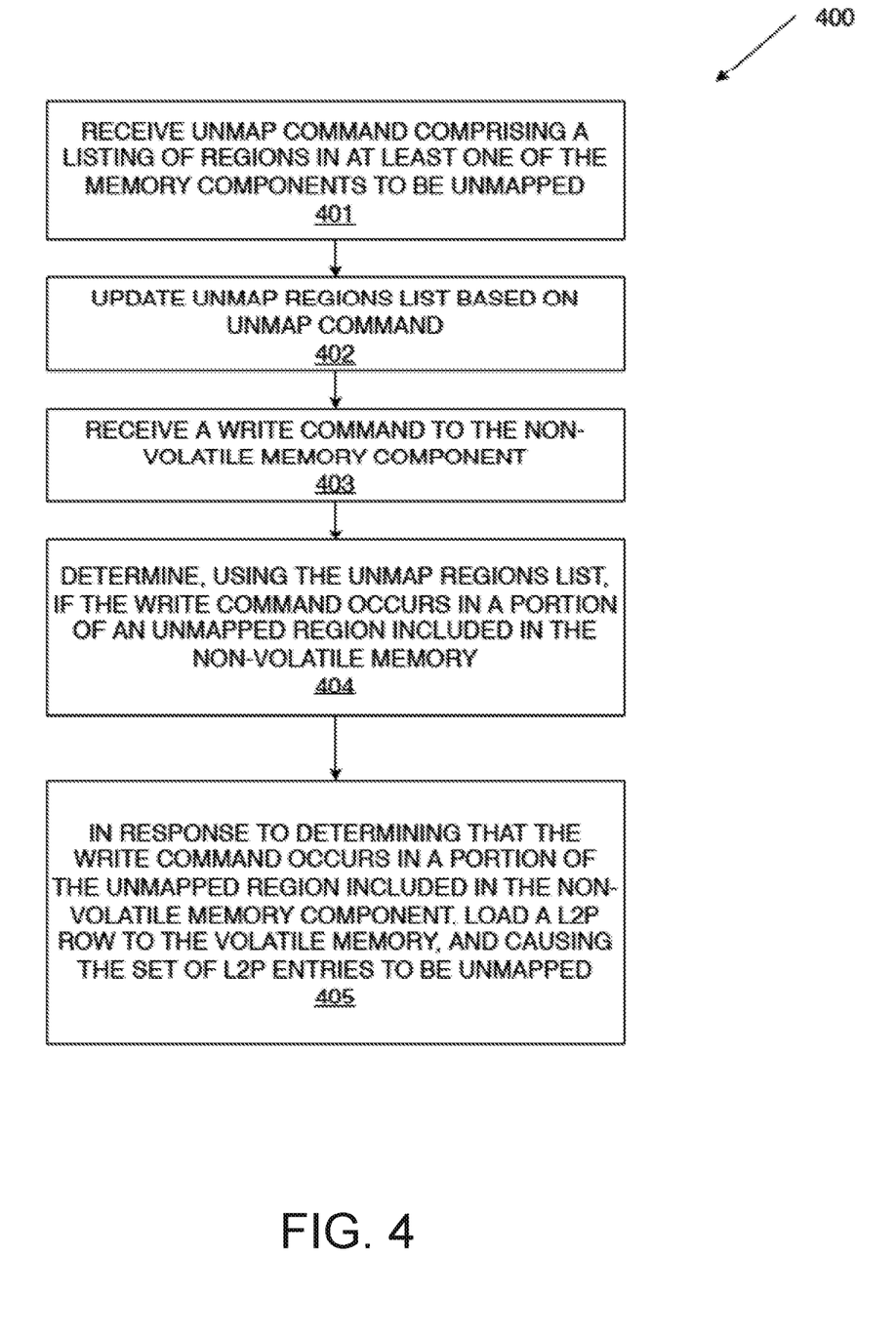
FIG. 4 is a flow diagram of an example method to manage FTL table updates in response to unmap commands in accordance with some embodiments of the present disclosure.

FIG. 4 is a flow diagram of an example method 400 to manage FTL table updates in response to unmap commands in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the memory unmap controller 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 401, a processor 117 receives an unmap command that includes a listing of the regions in at least one of the memory components 112A to 112N to be unmapped. The memory components 112A to 112N can include a non-volatile memory component and a volatile memory component. The processor 117, at operation 402, updates an unmap regions list based on the unmap command. To update the unmap regions list, in operation 402, the processor 117 can add entries corresponding to the listing of the regions in the unmap command to the unmap regions list. To add entries to the unmap regions list, the processor 117 can determine if a first region in the listing of the regions in the unmap command is adjacent to a region indicated in an existing entry that one of the entries in the unmap regions list and extend the region indicated in the existing entry to include the first region when the first region is adjacent to the existing entry.

The processor 117 receives a write command to the non-volatile memory component at operation 403 and determines, using the unmap regions list, if the write command occurs in a portion of an unmapped region of the non-volatile memory component, at operation 404. As shown at operation 405, in response to determining that the write command occurs in a portion of an unmapped region included in the non-volatile memory component, the processor 117 loads to the volatile memory a logical-to-physical (L2P) row and causes a set of L2P entries to be unmapped. The L2P row that is loaded in volatile memory comprises the set of L2P entries that map the portion of the unmapped region included in the non-volatile memory component. The L2P row is loaded from a flash translation layers (FTL) table included in the non-volatile memory component. In one embodiment, the processor 117 updates the unmap regions list after causing the set of L2P entries to be unmapped and issues the write command to the non-volatile memory.

Figure 5:
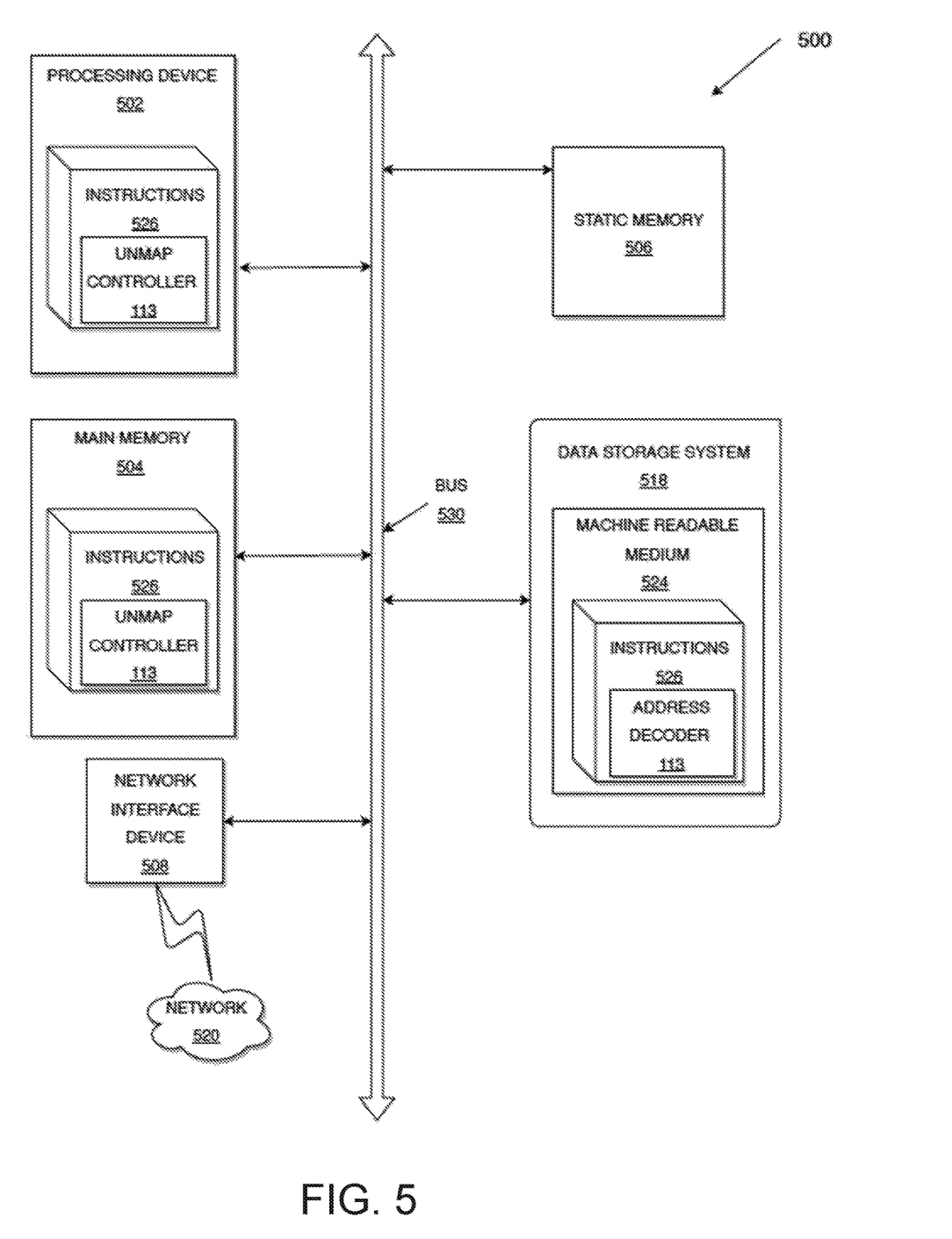
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the unmap controller 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to an unmap controller (e.g., the unmap controller 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks. CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a plurality of memory components comprising a non-volatile memory component and a volatile memory component; and
   a processing device operatively coupled with the plurality of memory components, the processing device configured to perform operations comprising:
   receiving an unmap command comprising a listing of a plurality of regions in at least one of the memory components to be unmapped;
   updating an unmap regions list based on the unmap command, wherein the unmap regions list comprises a plurality of entries, each of the entries indicates one of the memory components, a region in the one of the memory components, and an availability flag;
   receiving a write command to the non-volatile memory component;
   determining, using the unmap regions list, if the write command occurs in a portion of an unmapped region included in the non-volatile memory component; and
   in response to determining that the write command occurs in the portion of the unmapped region included in the non-volatile memory component,
   loading a logical-to-physical (L2P) row to the volatile memory, wherein the L2P row comprises a set of L2P entries mapping the portion of the unmapped region included in the non-volatile memory component, and causing the set of L2P entries to be unmapped.

2. The system of claim 1, wherein loading the L2P row further comprises loading the L2P row from a flash translation layers (FTL) table included in the non-volatile memory component.

3. The system of claim 1, wherein the processing device is configured to perform operations further comprising:
   issuing the write command to the non-volatile memory component.

4. The system of claim 1, wherein updating an unmap regions list based on the unmap command further comprises:
adding entries corresponding to the listing of the regions in the unmap command to the unmap regions list.

5. The system of claim 4, wherein adding entries corresponding to the listing of the regions in the unmap command further comprises:
determining if a first region in the listing of the regions in the unmap command is adjacent to a region indicated in an existing entry, wherein the existing entry is one of the entries in the unmap regions list, and
extending the region indicated in the existing entry to include the first region when the first region is adjacent to the existing entry.

6. The system of claim 1, wherein the processing device is configured to perform operations further comprising:
updating the unmap regions list after causing the set of L2P entries to be unmapped.

7. The system of claim 6, wherein updating the unmap regions list after causing the set of L2P entries to be unmapped further comprises:
modifying an existing entry in the unmap regions list to indicate that the existing entry is available when the L2P row encompasses all of a region indicated in the existing entry.

8. The system of claim 6, wherein updating the unmap regions list after causing the set of L2P entries to be unmapped further comprises:
when the L2P row splits a region indicated in an existing entry in the unmap regions list, splitting the existing entry into a first entry and a second entry.

9. The system of claim 1, wherein the unmap regions list is stored in another non-volatile memory component included in the plurality of memory components.

10. The system of claim 9, wherein the processing device is configured to perform operations further comprising:
loading the unmap regions list to the volatile memory when an activity is performed that causes the unmap regions list to be removed from the volatile memory.

11. The system of claim 1, wherein the portion of the unmapped region included in the non-volatile memory component is an entirety of the unmapped region included in the non-volatile memory component.

12. A method comprising:
receiving an unmap command comprising a listing of a plurality of regions in at least one of a plurality of memory components to be unmapped, the plurality of memory components comprises a non-volatile memory component and a volatile memory component;
updating an unmap regions list based on the unmap command, wherein the unmap regions list comprises a plurality of entries, each of the entries indicates one of the memory components, a region in the one of the memory components, and an availability flag;
receiving a write command to the non-volatile memory component;
determining, using the unmap regions list, if the write command occurs in a portion of an unmapped region included in the non-volatile memory component; and
in response to determining that the write command occurs in the portion of the unmapped region included in the non-volatile memory component,
loading a logical-to-physical (L2P) row to the volatile memory, wherein the L2P row comprises a set of L2P entries mapping the portion of the unmapped region included in the non-volatile memory component, and causing the set of L2P entries to be unmapped.

13. The method of claim 12, wherein loading the L2P row further comprises loading the L2P row from a flash translation layers (FTL) table included in the non-volatile memory component.

14. The method of claim 12, wherein further comprising:
issuing the write command to the non-volatile memory component.

15. The method of claim 12, wherein updating an unmap regions list based on the unmap command further comprises:
adding entries corresponding to the listing of the regions in the unmap command to the unmap regions list.

16. The method of claim 15, wherein adding entries corresponding to the listing of the regions in the unmap command further comprises:
determining if a first region in the listing of the regions in the unmap command is adjacent to a region indicated in an existing entry, wherein the existing entry is one of the entries in the unmap regions list, and
extending the region indicated in the existing entry to include the first region when the first region is adjacent to the existing entry.

17. The method of claim 12, further comprising:
updating the unmap regions list after causing the set of L2P entries to be unmapped.

18. The method of claim 12, wherein the unmap regions list is stored in another non-volatile memory component included in the plurality of memory components.

19. The method of claim 12, wherein the portion of the unmapped region included in the non-volatile memory component is an entirety of the unmapped region included in the non-volatile memory component.

20. At least one non-transitory machine-readable storage medium comprising instructions that, when executed by a processing device, cause the processing device to perform operations comprising:
receiving an unmap command comprising a listing of a plurality of regions in at least one of a plurality of memory components to be unmapped, the plurality of memory components comprises a non-volatile memory component and a volatile memory component;
updating an unmap regions list based on the unmap command, wherein the unmap regions list comprises a plurality of entries, each of the entries indicates one of the memory components, a region in the one of the memory components, and an availability flag;
receiving a write command to the non-volatile memory component;
determining, using the unmap regions list, if the write command occurs in a portion of an unmapped region included in the non-volatile memory component; and
in response to determining that the write command occurs in the portion of the unmapped region included in the non-volatile memory component,
loading a logical-to-physical (L2P) row to the volatile memory, wherein the L2P row comprises a set of L2P entries mapping the portion of the unmapped region included in the non-volatile memory component, and causing the set of L2P entries to be unmapped.

* * * * *